(12) United States Patent
Guo

(10) Patent No.: US 12,021,183 B2
(45) Date of Patent: *Jun. 25, 2024

(54) ELECTROCHEMICAL DEVICE

(71) Applicant: Ningde Amperex Technology Limited, Ningde (CN)

(72) Inventor: DongYang Guo, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 239 days.

This patent is subject to a terminal disclaimer.

(21) Appl. No.: 17/576,010

(22) Filed: Jan. 14, 2022

(65) Prior Publication Data

US 2022/0140438 A1    May 5, 2022

Related U.S. Application Data

(63) Continuation of application No. 16/162,625, filed on Oct. 17, 2018, now Pat. No. 11,264,677.

(30) Foreign Application Priority Data

Jun. 6, 2018 (CN) .......................... 201810574297.0

(51) Int. Cl.
*H01M 10/05* (2010.01)
*H01M 10/0525* (2010.01)
(Continued)

(52) U.S. Cl.
CPC ..... *H01M 10/0525* (2013.01); *H01M 50/417* (2021.01); *H01M 50/42* (2021.01);
(Continued)

(58) Field of Classification Search
CPC .......... H01M 10/0525; H01M 50/417; H01M 50/42; H01M 50/423; H01M 50/426;
(Continued)

(56) References Cited

U.S. PATENT DOCUMENTS 11,264,677 B2 * 3/2022 Guo ...................... H01M 50/42
2005/0037219 A1   2/2005 Ohlsson et al.
(Continued)

FOREIGN PATENT DOCUMENTS

CN       102017234 A    4/2011
CN       102339965 A    2/2012
(Continued)

OTHER PUBLICATIONS

Chinese Third Office Action dated Jan. 13, 2021 in counterpart application 201810574297.0, 9 pages in Chinese.
(Continued)

*Primary Examiner* — Michael L Dignan
(74) *Attorney, Agent, or Firm* — Maier & Maier, PLLC

(57) ABSTRACT

An electrochemical device includes a cathode, an anode and a separator, the separator being disposed between the cathode and the anode, the separator including a porous substrate and a porous layer, and the porous layer being disposed on a surface of the porous substrate and including inorganic particles and a binder, where a ratio of a puncture elongation of the porous substrate to a puncture force of the porous substrate is about 1.5 mm/N to about 25 mm/N. A lithium-ion battery including the separator, provided by the present application, improves the safety performance of the lithium-ion battery.

11 Claims, 1 Drawing Sheet

(51) Int. Cl.
*H01M 50/417* (2021.01)
*H01M 50/42* (2021.01)
*H01M 50/423* (2021.01)
*H01M 50/426* (2021.01)
*H01M 50/429* (2021.01)
*H01M 50/451* (2021.01)
*H01M 50/454* (2021.01)
*H01M 50/489* (2021.01)

(52) U.S. Cl.
CPC ....... *H01M 50/423* (2021.01); *H01M 50/426* (2021.01); *H01M 50/429* (2021.01); *H01M 50/451* (2021.01); *H01M 50/454* (2021.01); *H01M 50/489* (2021.01)

(58) Field of Classification Search
CPC ............. H01M 50/429; H01M 50/451; H01M 50/454; H01M 50/489; H01M 50/449; H01M 50/446; Y02E 60/10
See application file for complete search history.

(56) References Cited

U.S. PATENT DOCUMENTS

| | | | | |
|---|---|---|---|---|
| 2015/0372276 | A1* | 12/2015 | Mizuno | H01M 50/403 |
| | | | | 429/145 |
| 2018/0254454 | A1* | 9/2018 | Yoshimaru | H01M 50/463 |
| 2018/0254459 | A1* | 9/2018 | Arise | H01M 50/449 |
| 2019/0198836 | A1 | 6/2019 | Ishihara | |

FOREIGN PATENT DOCUMENTS

| | | | |
|---|---|---|---|
| CN | 102683628 | A | 9/2012 |
| CN | 102751459 | A | 10/2012 |
| CN | 202905830 | U | 4/2013 |
| CN | 103078076 | A | 5/2013 |
| CN | 103811700 | A | 5/2014 |
| CN | 104124418 | A | 10/2014 |
| CN | 104183805 | A | 12/2014 |
| CN | 104254933 | A | 12/2014 |
| CN | 104272500 | A | 1/2015 |
| CN | 104871342 | A | 8/2015 |
| CN | 104981921 | A | 10/2015 |
| CN | 104993082 | A | 10/2015 |
| CN | 105144429 | A | 12/2015 |
| CN | 204857825 | U | 12/2015 |
| CN | 204905334 | U | 12/2015 |
| CN | 105449140 | A | 3/2016 |
| CN | 105659410 | A | 6/2016 |
| CN | 106252564 | A | 12/2016 |
| CN | 106450103 | A | 2/2017 |
| CN | 106489215 | A | 3/2017 |
| CN | 106531935 | A | 3/2017 |
| CN | 206059490 | U | 3/2017 |
| CN | 106953050 | A | 7/2017 |
| JP | 2018073619 | A | 5/2018 |

OTHER PUBLICATIONS

"Provisions of the People's Republic of China on the Customs Administration of Declaration for the Import and Export of Goods," pp. 258-262 in Chinese, 1 pages English Abstract of p. 260.

Chinese First Office Action and Search Report dated Aug. 5, 2020 in counterpart application 201810574297.0, 8 pages in Chinese.

Extended European Search Report in the counterpart application EP Application No. 19 17 6230 dated Aug. 16, 2019, 7 pages in English.

Office Action dated Oct. 27, 2020, in connection with corresponding Chinese Application No. 201810574297.0 (17 pp., including machine-generated English translation).

Office Action dated Apr. 23, 2021 in connection with corresponding Chinese Application No. 201810574297.0; 5 pages.

Office Action dated Jul. 16, 2021 in connection with related U.S. Appl. No. 16/162,625; 4 pages.

Office Action dated Jul. 27, 2020 in connection with related U.S. Appl. No. 16/162,625; 7 pages.

Office Action dated May 14, 2021 in connection with related U.S. Appl. No. 16/162,625; 12 pages.

Office Action dated Apr. 13, 2020 in connection with related U.S. Appl. No. 16/162,625; 15 pages.

Office Action dated Feb. 5, 2021 in connection with related U.S. Appl. No. 16/162,625; 12 pages.

Office Action dated Sep. 14, 2021 in connection with related U.S. Appl. No. 16/162,625; 12 pages.

* cited by examiner

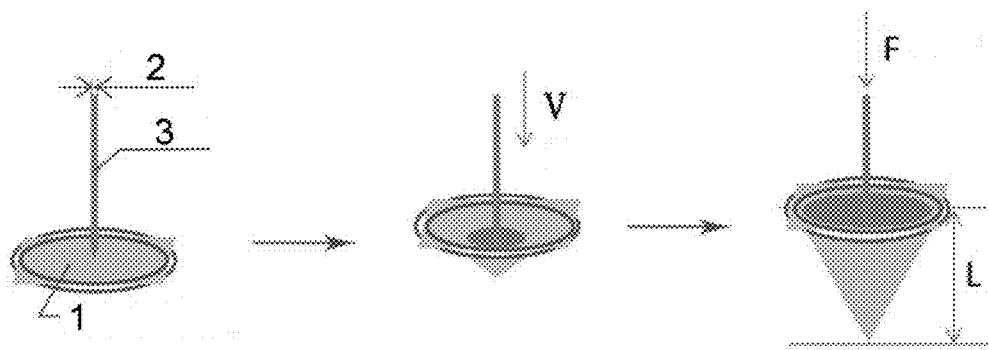

ELECTROCHEMICAL DEVICE

CROSS REFERENCE TO RELATED APPLICATIONS

This is a continuation application of patent application Ser. No. 16/162,625, filed on Oct. 17, 2018, assigned to the same assignee, which is based on and claims priority to China Patent Application No. 201810574297.0 filed on Jun. 6, 2018, the contents of which are incorporated by reference herein.

BACKGROUND

1. Technical Field

Embodiments of the present application relate to an electrochemical device, and, in particular, to a separator and a lithium-ion battery including the separator.

2. Background

At present, lithium-ion batteries are widely used as energy sources in fields such as various electronic products and electric vehicles, and have attracted a lot of research and development. In these fields, in addition to relatively high volume or weight energy density, a lithium-ion battery is also required to have relatively high safety and reliability under harsh conditions (such as impact, nail penetration and hot box). Therefore, the requirements on the safety performance of lithium-ion batteries are increasingly high in the industry, and there is an urgent need to improve the existing lithium-ion batteries.

SUMMARY

Embodiments of the present application intend to improve the safety performance of a lithium-ion battery by providing the lithium-ion battery including a separator.

Some embodiments of the present application provide a separator, the separator comprising a porous substrate and a porous layer, and the porous layer being disposed on a surface of the porous substrate and comprising inorganic particles and a binder, where a ratio of a puncture elongation of the porous substrate to a puncture force of the porous substrate is about 1.5 mm/N to about 25 mm/N.

According to some embodiments of the present application, the puncture force of the porous substrate is about 0.1 N to about 10 N.

According to some embodiments of the present application, the absolute value of a difference between machine direction (MD) tensile strength of the porous substrate and transverse direction (TD) tensile strength of the porous substrate is about 20000 N/cm$^2$ or below.

According to some embodiments of the present application, the binder applicable to the separator of the present application comprises, but is not limited to, at least one of the following polymers: vinylidene fluoride-hexafluoropropylene copolymer, vinylidene fluoride-trichloroethylene copolymer, polyacrylate ester, polyacrylic acid, polyacrylate salt, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, acrylonitrile-styrene-butadiene copolymer, polyvinyl alcohol, polyvinyl ether, polytetrafluoroethylene, polyhexafluoropropylene, styrene-butadiene copolymer and polyvinylidene fluoride.

According to some embodiments of the present application, the inorganic particles applicable to the separator of the present application comprise, but is not limited to, at least one of the following inorganic particles: aluminum oxide ($Al_2O_3$), silicon dioxide ($SiO_2$), magnesium oxide (MgO), titanium oxide ($TiO_2$), hafnium dioxide ($HfO_2$), tin oxide ($SnO_2$), cerium dioxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide and barium sulfate.

According to some embodiments of the present application, the porous substrate applicable to the separator of the present application is a polymer film, a multilayer polymer film or a nonwoven fabric formed by any one or a mixture of two or more of the following polymers: polyethylene, polypropylene, polyethylene terephthalate, polybutylene terephthalate, poly(phenylene benzenedicarboxamide), polyester, polyacetal, polyamide, polycarbonate, polyimide, polyether-ether-ketone, polyaryletherketone, polyetherimide, polyamideimide, polybenzimidazole, polyethersulfone, polyphenylene ether, cycloolefin copolymer, polyphenylene sulfide, and poly(vinyl naphthalene).

According to some embodiments of the present application, the porous substrate applicable to the separator of the present application has a molecular weight of about 0.2 million to about 2.5 million, a thickness of about 1 μm to about 40 μm, a porosity of about 15% to about 60%, and an air permeability of about 800 s/100 cc or below.

Another embodiment of the present application provides an electrochemical device, the electrochemical device comprising a cathode, an anode, and a separator according to the present application.

According to some embodiments of the present application, the electrochemical device is a lithium-ion battery.

The additional aspects and advantages of the embodiments of the present application are described and illustrated in part in the subsequent description, or explained by the implementation of the embodiments of the present application.

BRIEF DESCRIPTION OF THE DRAWINGS

FIG. 1 is a schematic diagram of a puncture test according to an embodiment of the present application.

DETAILED DESCRIPTION

Embodiments of the present application are described in detail below. Throughout the specification, the same or similar components and components having the same or similar functions are denoted by similar reference numerals. The embodiments described herein with respect to the accompanying drawings are illustrative and graphical, and are used to provide a basic understanding of the present application. The embodiments of the present application should not be construed as limiting the embodiments of the present application.

References throughout the specification to "embodiments", "partial embodiments," "an embodiment," "another example", "examples", "specific examples" or "partial examples" mean that at least one embodiment or example in the embodiments of the present application includes specific features, structures, materials or characteristics described in the embodiment or example. Therefore, descriptions appearing throughout the specification, such as "in some embodiments", "in the embodiments", "in an embodiment", "in another example", "in an example", in a particular example" or "examples", are not necessarily referring to the same embodiments or examples in the embodiments of the present application. Furthermore, the particular features, structures, materials or characteristics herein may be combined in any suitable manner in one or more embodiments or examples.

As used herein, the term "about" is used to describe and explain minor changes. When used in conjunction with an event or situation, the term may refer to examples where the event or situation occurs exactly as intended and to examples where the event or situation occurs similarly to as was intended. For example, when used in conjunction with a numerical value, the term may refer to a variation range that is less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other numerical values are sometimes presented herein in a range format. It should be understood that such range formats are for convenience and brevity, should be interpreted with flexibility, and include not only those numerical values that are specifically designated as range limitations, but also include all individual numerical values or sub-ranges that are within the range, as each value and sub-range are specified explicitly.

The embodiments of the present application are characterized in that a new separator is provided. Compared with a conventional separator, the separator of the present application exhibits high elasticity, and during the physical destruction of lithium-ion battery abuse (such as impact and nail penetration), can be effectively prevented from tearing under external stress conditions, effectively wrap a short-circuit point generated under the stress, reduce the probability of short circuits, further reduce a short-circuit current, and effectively reduce the risk of thermal runaway of a lithium-ion battery, thereby improving the safety performance of the lithium-ion battery.

The separator used in the embodiments of the present application has the following characteristics: the ratio of the puncture elongation of the porous substrate to the puncture force of the porous substrate ranges from about 1.5 mm/N to about 25 mm/N. According to some embodiments, the ratio ranges from about 1.5 mm/N to about 20 mm/N, and according to other embodiments, the ratio ranges from about 1.8 mm/N to about 12 mm/N.

If the ratio of the puncture elongation of the porous substrate to the puncture force of the porous substrate is small, the porous substrate exhibits strong brittleness, and is easily pierced and torn under the stress condition of a foreign matter, and a short-circuit point is generated to cause a failure of the lithium-ion battery. If the ratio of the puncture elongation of the porous substrate to the puncture force of the porous substrate is too large, the separator exhibits strong flexibility, and is prone to tensile deformation during coating or winding, which causes process problems, and the risk of being pierced by hard particles in the process is greatly increased.

The puncture force of the porous substrate in a puncture test is about 0.1 N to about 10 N. According to some embodiments, the puncture force is about 1 N to about 7 N, and the puncture elongation is about 4 mm to about 20 mm. The lithium-ion battery using the separator can undergo large deformation along with external force during the external foreign matter piercing process, and wrap the foreign matter, thereby preventing the occurrence or expansion of the short circuit point, and effectively inhibiting the occurrence of the short circuit.

The absolute value of a difference between the machine direction (MD) tensile strength and the transverse direction (TD) tensile strength of the porous substrate is about 20000 $N/cm^2$ or below. According to some embodiments, the absolute value is about 10000 $N/cm^2$ or below. According to other embodiments, the absolute value is about 5000 $N/cm^2$ or below. If the difference between the MD tensile strength and the TD tensile strength is large, in the nail penetration process, the porous substrate is easy to tear in a direction of weaker strength to form a strip-like crack, which makes it impossible to effectively encapsulate the short-circuit point, and finally causes the failure of the lithium-ion battery due to thermal runaway.

The separator in the embodiments of the present application comprises a porous substrate and a porous layer, the porous layer being disposed on a surface of the porous substrate and comprising inorganic particles and a binder. For example, the porous layer may be disposed on one surface of the porous substrate, or disposed on two surfaces of the porous substrate, or disposed on a portion of one of the surfaces of the porous substrate.

According to an embodiment of the present application, the porous substrate applicable to the separator is a polymer film, a multilayer polymer film or a nonwoven fabric formed by any one or a mixture of more of the following polymers: polyethylene, polypropylene, polyethylene terephthalate, polybutylene terephthalate, poly(phenylene benzenedicarboxamide), polyester, polyacetal, polyamide, polycarbonate, polyimide, polyether-ether-ketone, polyaryletherketone, polyetherimide, polyamideimide, polybenzimidazole, polyethersulfone, polyphenylene oxide, cycloolefin copolymer, polyphenylene sulfide, and poly(vinyl naphthalene). The porous substrate has a molecular weight of about 0.2 million to about 2.5 million, a thickness of about 1 μm to about 40 μm, a porosity of about 15% to about 60%, and an air permeability of about 800 s/100 cc or below.

According to an embodiment of the present application, the inorganic particles forming the porous layer comprise, but not limited to, at least one of the following inorganic particles: aluminum oxide ($Al_2O_3$), silicon dioxide ($SiO_2$), magnesium oxide (MgO), titanium oxide ($TiO_2$), hafnium dioxide ($HfO_2$), tin oxide ($SnO_2$), cerium dioxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide and barium sulfate.

According to another embodiment of the present application, the binder forming the porous layer comprises, but not limited to, at least one of the following polymers: vinylidene fluoride-hexafluoropropylene copolymer, vinylidene fluoride-trichloroethylene copolymer, polyacrylate ester, polyacrylic acid, polyacrylate salt, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, acrylonitrile-styrene-butadiene copolymer, polyvinyl alcohol, polyvinyl ether, polytetrafluoroethylene, polyhexafluoropropylene, styrene-butadiene copolymer and polyvinylidene fluoride.

The embodiments of the present application further provide a lithium-ion battery including the above separator. The lithium-ion battery further comprises a cathode containing a cathode material, an anode containing an anode material, and an electrolyte, where the separator of the present application is disposed between the cathode and the anode. A cathode current collector may be an aluminum foil or a nickel foil, and an anode current collector may be a copper foil or a nickel foil.

In the above lithium-ion battery, the cathode includes a cathode material capable of absorbing and releasing lithium (Li) (hereinafter, sometimes referred to as "a cathode material capable of absorbing/releasing lithium Li"). Examples of the cathode material capable of absorbing/releasing lithium (Li) may include one or more of lithium cobaltate, lithium nickel cobalt manganese oxide, lithium nickel cobalt aluminum oxide, lithium manganate, lithium manganese iron phosphate, lithium vanadium phosphate, oxy-lithium vanadium phosphate, lithium iron phosphate, lithium titanate and lithium-rich manganese-based material.

In the above cathode material, the chemical formula of lithium cobaltate may be $Li_xCo_aM1_bO_2$, where M1 is at least one selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) and silicon (Si), and the values of x, a, b and c are respectively in the following ranges: $0.8 \leq x \leq 1.2$, $0.8 \leq a \leq 1$, $0 \leq b \leq 0.2$ and $-0.1 \leq c \leq 0.2$;

In the above cathode material, the chemical formula of the lithium nickel cobalt manganese oxide or lithium nickel cobalt aluminum oxide may be $Li_yNi_dM2_eO_{2-f}$, wherein M2 is at least one selected from cobalt (Co), manganese (Mn), magnesium (Mg), aluminum (Al), Boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) and silicon (Si), and the values of y, d, e and f are respectively in the following ranges: $0.8 \leq y \leq 1.2$, $0.3 \leq d \leq 0.98$, $0.02 \leq e \leq 0.7$ and $-0.1 \leq f \leq 0.2$;

In the above cathode material, the chemical formula of lithium manganate is $Li_zMn_{2-g}M3_gO_{4-h}$, where M3 is at least one selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, g and h are respectively in the following ranges: $0.8 \leq z \leq 1.2$, $0 \leq g \leq 1.0$ and $-0.2 \leq h \leq 0.2$.

The anode includes an anode material capable of absorbing and releasing lithium (Li) (hereinafter, sometimes referred to as "an anode material capable of absorbing/releasing lithium Li"). Examples of the anode material capable of absorbing/releasing lithium (Li) may include carbon materials, metal compounds, oxides, sulfides, nitrides of lithium such as LiN3, lithium metal, metals forming alloys together with lithium, and polymer materials.

Examples of the carbon material may include low graphitized carbon, easy-to-graphitize carbon, artificial graphite, natural graphite, mesophase carbon microspheres, soft carbon, hard carbon, pyrolytic carbon, coke, vitreous carbon, organic polymer compound sintered body, carbon fibers and activated carbon. The coke may include pitch coke, needle coke and petroleum coke. The organic polymer compound sintered body refers to a material obtained by calcining a polymer material such as a phenol plastic or a furan resin at a suitable temperature to carbonize it, and some of these materials are classified into low graphitized carbon or easy-to-graphitize carbon. Examples of the polymer material may include polyacetylene and polypyrrole.

Among these anode materials capable of absorbing/releasing lithium (Li), a material whose charging and discharging voltages are close to the charging and discharging voltages of lithium metal is selected. This is because the lower the charging and discharging voltages of the anode material are, the more likely the lithium-ion battery has a higher energy density. The anode material may be a carbon material because their crystal structures are only slightly changed during charging and discharging, and therefore, a good cycle performance and large charging and discharging capacities can be obtained. In particular, graphite may be selected because it can provide a large electrochemical equivalent and a high energy density.

Furthermore, the anode material capable of absorbing/releasing lithium (Li) may include elemental lithium metal, metal elements and semimetal elements capable of forming alloys together with lithium (Li), alloys and compounds including such elements, and the like. For example, they are used together with carbon materials since the good cycle performance and high energy density can be obtained in this case. In addition to the alloys including two or more metal elements, the alloys used herein also include alloys containing one or more metal elements and one or more semimetal elements. The alloys may be in the form of a solid solution, a eutectic crystal (eutectic mixture), an intermetallic compound, and a mixture thereof.

Examples of the metal elements and the semimetal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the above alloys and compounds may include a material having a chemical formula: $Ma_sMb_tLi_u$ and a material having a chemical formula: $Ma_pMc_qMd_r$. In these chemical formulae, Ma represents at least one of metal elements and semimetal elements capable of forming an alloy together with lithium; Mb represents at least one of metal elements and semimetal elements other than lithium and Ma; Mc represents at least one of the non-metal elements; Md represents at least one of metal elements and semimetal elements other than Ma; and s, t, u, p, q and r satisfy $s>0$, $t \geq 0$, $u \geq 0$, $p>0$, $q>0$ and $r \geq 0$.

In addition, an inorganic compound not including lithium (Li), such as $MnO_2$, $V_2O_5$, $V_6O_{13}$, NiS and MoS, may be used in the anode.

The above lithium-ion battery further includes an electrolyte, and the electrolyte may be one or more of a gel electrolyte, a solid electrolyte and an electrolytic solution, and the electrolytic solution includes a lithium salt and a nonaqueous solvent.

The lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, the lithium salt is $LiPF_6$ because it can provide a high ionic conductivity and improve the cycle performance.

The nonaqueous solvent may be a carbonate compound, a carboxylate compound, an ether compound, other organic solvents, or a combination thereof.

The carbonate compound may be a chain carbonate compound, a cyclic carbonate compound, a fluorocarbonate compound, or a combination thereof.

Examples of the chain carbonate compound are diethyl carbonate (DEC), dimethyl carbonate (DMC), dipropyl carbonate (DPC), methylpropyl carbonate (MPC), ethylpropyl carbonate (EPC), methylethyl carbonate (MEC) and a combination thereof. Examples of the cyclic carbonate compound are ethylene carbonate (EC), propylene carbonate (PC), butylene carbonate (BC), vinyl ethylene carbonate (VEC) and a combination thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate and a combination thereof.

Examples of the carboxylate compound are methyl acetate, ethyl acetate, propyl propionate, n-propyl acetate, t-butyl acetate, methyl propionate, ethyl propionate, γ-butyrolactone, decalactone, valerolactone, mevalonolactone, caprolactone, methyl formate and a combination thereof.

Examples of the ether compound are dibutyl ether, tetraethylene glycol dimethyl ether, diglyme, 1,2-dimethoxyethane, 1,2-diethoxyethane, ethoxy methoxyethane, 2-methyltetrahydrofuran, tetrahydrofuran and a combination thereof.

Examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate and a combination thereof.

Although the lithium-ion battery is used as an example for description above, after reading the present application, those skilled in the art can conceive that the separator of the present application can be used in other suitable electrochemical devices. Such an electrochemical device includes any device that generates an electrochemical reaction, and its specific examples include all kinds of primary batteries, secondary batteries, fuel cells, solar cells, or capacitors. In particular, the electrochemical device is a lithium secondary battery, including a lithium metal secondary battery, a lithium-ion secondary battery, a lithium polymer secondary battery or a lithium ion polymer secondary battery.

The electrochemical device can be manufactured by conventional methods known to those skilled in the art. In an embodiment of the method for manufacturing an electrochemical device, a separator is inserted between the cathode and the anode to form an electrode assembly, and then an electrolyte is injected into the assembly, thereby providing the electrochemical device. According to the manufacturing method and the desired performance of the final product, the electrolyte may be injected in a suitable step during the manufacturing process of the electrochemical device. In other words, the electrolyte can be injected prior to the assembly of the electrochemical device or in the final step during the assembly of the electrochemical device.

The method which can be used to apply the separator of the present application to the electrochemical device includes not only a conventional winding method, but also a lamination (stacking) and folding method of the separator and a cathode/anode.

Hereinafter, a lithium-ion battery is used as an example and specific embodiments are used to describe the preparation of the lithium-ion battery. Those skilled in the art should appreciate that the preparation methods described in the present application are merely examples, and any other suitable preparation method falls within the scope of the present application.

I. Preparation Methods and Test Methods

The preparation methods of the separator and the lithium-ion battery and the test process of the lithium-ion battery are explained as follows.

1. Preparation of Separators

The separators E1 to E24 and C1 to C3 were respectively prepared according to specific manners described in the following embodiments 1-24 and comparative embodiments 1-3.

2. Preparation Method of Lithium-Ion Battery

An active material lithium cobaltate, a conductive agent conductive carbon black (Super P) and a binder polyvinylidene fluoride (PVDF) were thoroughly stirred and uniformly mixed in a weight ratio of 94:3:3 in an N-methylpyrrolidone solvent system to form a cathode slurry, the cathode slurry was uniformly coated on front and back surfaces of a cathode current collector aluminum foil and dried at 85° C. to obtain a cathode active material layer, and the cathode active material layer was subjected to cold pressing, splitting, slice cutting and cathode tab welding to obtain a cathode.

An active material artificial graphite, a conductive agent conductive carbon black (Super P), a binder styrene-butadiene rubber (SBR) and a thickener sodium carboxymethyl cellulose (CMC) were thoroughly stirred and uniformly mixed in a weight ratio of 97:1:1.5:0.5 in a deionized water solvent system to form an anode slurry, the anode slurry was uniformly coated on front and back surfaces of an anode current collector copper foil and dried at 85° C. to form an anode active material layer, and the anode active material layer was subjected to cold pressing, splitting, slice cutting and anode tab welding to obtain an anode.

A solution prepared from a lithium salt LiPF6 and a nonaqueous organic solvent (ethylene carbonate (EC):diethyl carbonate (DEC):ethyl methyl carbonate (EMC):vinylene carbonate (VC)=8:85:5:2, mass ratio) in a mass ratio of 8:92 was used as an electrolytic solution of the lithium-ion battery.

The cathode, the separator and the anode were sequentially stacked, so that the separator prepared according to the following embodiments performed a separation function between the cathode and the anode. In some implementation manners, the separator might also be coated on the surface of the cathode or anode. Winding was further performed to obtain an electrode assembly. The electrode assembly was placed in a package, the electrolytic solution was injected, packaging was performed, and then formation was performed to prepare the final lithium-ion battery.

3. Test Methods of Separator 3.1 Thickness Test of Separator

A "LITEMATIC" VL-50 model was firstly adopted with a test pressure of 0.01N. For the thickness test of the porous substrate of the separator, 10-15 sample points on the porous substrate were uniformly tested and recorded, and an average thereof was taken as the thickness of the porous substrate. As for the thickness test of the porous layer, the thickness of the porous substrate was firstly tested, and then the thickness after coating was tested. The thickness of the porous substrate was subtracted from the thickness after coating, and divided by 2 if there were two porous layers, to obtain the thickness of the porous layer.

3.2 Air Permeability Test of Porous Substrate

A Gurley4110N air permeability tester was adopted. The time required for 100 cc of gas to pass through the porous substrate was measured and recorded as an air permeability value (s/100 cc) of the porous substrate. 5 samples were uniformly taken from the porous substrate sample to test the air permeability, and an average was taken as the air permeability of the porous substrate, wherein the sample size was 50 mm*100 mm.

3.3 Porosity Test of Porous Substrate

A porous substrate sample having a size of 50 mm*100 mm was taken. 10 porous substrates were placed in a true porosity tester (Model: AccuPycII1340) to test the porosity of the porous substrate and the true volume V of the porous substrate sample, wherein a decimillimetre thickness tester was used to test the thickness T of the 10 porous substrates, the apparent volume of the porous substrate was calculated based on V0=50*100*T, and then a porosity calculated value of the porous substrate was (V0−V)/V0*100%.

3.4 Puncture Test of Porous Substrate

By using a high-iron tensile machine, the porous substrate was fixed in a fixture having a circular hole in the middle, wherein the diameter of the circular hole was 30 mm. By using a puncture tester, the fixed porous substrate was punctured by a circular puncture needle having a needle diameter of 1 mm, wherein the puncture speed was 50 mm/min, and then the puncture elongation L and puncture force F generated at the time when the porous substrate was punctured were recorded, as shown in FIG. 1, and a ratio L/F of the puncture elongation to the puncture force of the porous substrate was calculated.

3.5 Tensile Test of Porous Substrate

A porous substrate sample strip having a width of 20 mm and a length of 100 mm was prepared in MD and TD directions. The porous substrate was clamped to two ends of the upper and lower clamps of the high-iron tensile machine at a tensile speed of 50 mm/min and a spacing of 40 mm. The value of the force breaking the porous substrate was recorded as tensile force F, which was then divided by the width d and the thickness t of the porous substrate to obtain the tensile strength S=F/(d*t) of the porous substrate.

3.6 Nail Penetration Test of Lithium-Ion Battery

The lithium-ion batteries in the comparative embodiments and the embodiments were taken 100 each, charged at a constant current of 0.5 C at normal temperature to a voltage of 4.4V, and further charged to a current of 0.05 C at a constant voltage of 4.4V to make it in a 4.4 V full charge state. A nail having a diameter of 4 mm was used for nail penetration at a speed of 50 mm/s to observe whether the lithium-ion battery produces smoke, fire or explosion. If not, the lithium-ion battery was considered as passing the nail penetration test.

Test data appearing in the following embodiments were measured using the above test methods.

II. Embodiments

Specific implementation manners of the separator provided by the present application are described in detail below.

1. Embodiment 1 and Comparative Embodiments 1-3

Embodiment 1 (separator E1)

PE powder having a molecular weight of 1.1 million and paraffin oil were mixed in a ratio of the PE powder to the paraffin oil being 1:4, and extruded at high temperature and cast into a film. The film was then stretched in a machine direction and a transverse direction, wherein the stretching ratio in the machine direction was 5.6 times, and the stretching ratio in the transvers direction was 5.6 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E1, where the thickness of the dried porous layer was 3 μm.

Comparative Embodiments 1-3

Comparative Embodiment 1 (separator C1)

High-molecular-weight PE powder having a molecular weight of 1 million and paraffin oil were mixed in a ratio of the PE powder to the paraffin oil being 3:7, and extruded at high temperature and casted into a film. The film was then stretched in the machine direction and the transverse direction, wherein the stretching ratio in the machine direction was 7 times, and the stretching ratio in the transvers direction was 6 times. After that, the paraffin oil in the porous substrate was extracted with dichloromethane, followed by performing the drying and heat setting to the porous substrate to obtain the separator C1, which only includes the porous substrate.

Comparative Embodiment 2 (Separator C2)

High-molecular-weight PE powder having a molecular weight of 1 million and paraffin oil were mixed in a ratio of the PE powder to the paraffin oil being 3:7, and extruded at high temperature and cast into a film. The film was stretched in the machine direction and the transverse direction, wherein the stretching ratio in the machine direction was 7 times, and the stretching ratio in the transvers direction was 6 times. After that, the paraffin oil in the porous substrate was extracted with dichloromethane, followed by performing the drying and heat setting to the porous substrate to obtain a porous substrate (PE). Further, inorganic particles aluminum oxide and a binder polyacrylate ester in a mass ratio of 70:30 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator C2, wherein the thickness of the dried porous layer was 3 μm.

Comparative Embodiment 3 (Separator C3)

High-molecular-weight PE powder having a molecular weight of 1 million and paraffin oil were mixed in a ratio of the PE powder to the paraffin oil being 3:7, and extruded at high temperature and casted into a film. The film was then stretched in the machine direction and the transverse direction, wherein the stretching ratio in the machine direction was 7 times, and the stretching ratio in the transvers direction was 7 times. After that, the paraffin oil in the porous substrate was extracted with dichloromethane, followed by performing the drying and heat setting to the porous substrate. Further, inorganic particles aluminum oxide and a binder PVDF in a mass ratio of 70:30 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator C3, wherein the thickness of the dried porous layer was 3 μm.

Performance tests were performed on Embodiment 1 and Comparative Embodiments 1-3 respectively. Test results are shown in Table 1 below:

| Material No. | Ratio of Puncture Elongation to Puncture Force (mm/N) | Puncture Force (N) | Absolute Value of MD-TD Tensile Strength Difference (N/cm$^2$) | Thickness of Porous Substrate (um) | Porosity of Porous Substrate (%) | Air Permeability of Porous Substrate (s/100 cc) | Nail Penetration Test Pass Rate (%) |
|---|---|---|---|---|---|---|---|
| E1 | 3.1 | 2.5 | 1360 | 7 | 30 | 355 | 80 |
| C1 | 1.0 | 2.5 | 10000 | 7 | 34 | 180 | 0 |
| C2 | 1.0 | 2.5 | 10000 | 7 | 34 | 180 | 0 |
| C3 | 0.8 | 2.5 | 10000 | 7 | 41 | 100 | 0 |

The data in Table 1 shows that compared with Comparative Embodiments C1-C3, the separator E1 of Embodiment 1 has the highest nail penetration test pass rate of up to 80%, while Comparative Embodiments C1-C3 have the nail penetration test pass rate of only 0%. The superior penetration test pass rate of the separator E1 is mainly attributed to the selection of the appropriate ratio of the puncture elongation to the puncture force of the porous substrate.

E1 is a separator shown in an embodiment of the present application. By adjusting the ratio of the puncture elongation to the puncture force of the porous substrate, the puncture force, the absolute value of the difference between the MD tensile strength and the transverse direction (TD) tensile strength, the type of binder and inorganic particles in the porous layer, and other factors, the present application also provides Embodiments 2-25, and the obtained samples were subjected to corresponding performance tests as follows.

2. Embodiments 2-6 (Changing the Ratio of the Puncture Elongation to the Puncture Force of the Porous Substrate)

Embodiment 2 (separator E2)

PE powder having a molecular weight of 1.1 million and paraffin oil were mixed in a ratio of the PE powder to the paraffin oil being 1:4, and extruded at high temperature and cast into a film. The film was stretched in the machine direction and the transverse direction, wherein the stretching ratio in the machine direction was 6.5 times, and the stretching ratio in the transvers direction was 6 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E2, where the thickness of the dried porous layer was 3 μm.

Embodiment 3 (Separator E3)

PE powder having a molecular weight of 0.7 million and paraffin oil were mixed in a ratio of the PE powder to the paraffin oil being 1:5, extruded at high temperature and cast into a film. The film was stretched in the machine direction and the transverse direction, wherein the stretching ratio in the machine direction was 5.5 times, and the stretching ratio in the transvers direction was 4.6 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E3, where the thickness of the dried porous layer was 3 μm.

Embodiment 4 (Separator E4)

PE powder having a molecular weight of 0.8 million and paraffin oil were mixed in a ratio of the PE powder to the paraffin oil being 1:5, extruded at high temperature and cast into a film. The film was stretched in the machine direction and the transverse direction, wherein the stretching ratio in the machine direction was 5.2 times, and the stretching ratio in the transvers direction was 4.6 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E4, where the thickness of the dried porous layer was 3 μm.

Embodiment 5 (Separator E5)

PE powder having a molecular weight of 0.8 million and paraffin oil were mixed in a ratio of the PE powder to the paraffin oil being 1:5, extruded at high temperature and cast into a film. The film was stretched in the machine direction and the transverse direction, wherein the stretching ratio in the machine direction was 4.5 times, and the stretching ratio in the transvers direction was 4 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E5, where the thickness of the dried porous layer was 3 μm.

Embodiment 6 (Separator E6)

PE powder having a molecular weight of 0.6 million with copolymerized octene monomer and ethylene and paraffin oil were mixed in a ratio of the PE powder to the paraffin oil being 1:5, extruded at high temperature and cast into a film. The film was stretched in the machine direction and the transverse direction, wherein the stretching ratio in the machine direction was 5 times, and the stretching ratio in the transvers direction was 4.5 times. After that, the paraffin oil in the porous substrate was extracted with dichloromethane, followed by performing the drying and heat setting to the porous substrate. Furthermore, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E6, where the thickness of the dried porous layer was 3 μm.

Table 2 lists the performance test results of E2-E6.

significant influence on the nail penetration test pass rate. Specifically, within a certain range, the higher the ratio of the puncture elongation to the puncture force of the porous substrate, the higher the nail penetration test pass rate. However, the processability of the separator may deteriorate as the ratio of the puncture elongation to the puncture force of the porous substrate increases. Therefore, the ratio of the puncture elongation to the puncture force of the porous substrate needs to be controlled within a reasonable range to ensure a high nail penetration test pass rate and good processprocessability.

3. Embodiments 7-11 (Changing the Puncture Force of the Porous Substrate)

Embodiment 7 (separator E7)

PE powder having a molecular weight of 0.2 million and paraffin oil were mixed in a ratio of the PE powder to the paraffin oil being 3:7, extruded at high temperature and cast into a film. The film was stretched in the machine direction and the transverse direction, wherein the stretching ratio in the machine direction was 3.9 times, and the stretching ratio in the transvers direction was 3 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E7, where the thickness of the dried porous layer was 3 μm.

Embodiment 8 (Separator E8)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 6 times, and the stretching ratio in the transvers direction was 5 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9

TABLE 2

| Material No. | Ratio of Puncture Elongation to Puncture Force (mm/N) | Puncture Force (N) | Absolute Value of MD-TD Tensile Strength Difference (N/cm$^2$) | Thickness of Porous Substrate (um) | Porosity of Porous Substrate (%) | Air Permeability of Porous Substrate (s/100 cc) | Nail Penetration Test Pass Rate (%) |
|---|---|---|---|---|---|---|---|
| E2 | 1.5 | 2.5 | 10000 | 7 | 25 | 350 | 10 |
| E3 | 6.7 | 2.5 | 10000 | 7 | 27 | 330 | 30 |
| E4 | 8.3 | 2.5 | 10000 | 7 | 25 | 400 | 40 |
| E5 | 12.2 | 2.5 | 10000 | 7 | 24 | 250 | 50 |
| E6 | 20.0 | 2.5 | 10000 | 7 | 29 | 246 | 60 |

Based on the above test data, it is known that the ratio of the PE powder to the paraffin oil being the puncture elongation to the puncture force of the porous substrate has a were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E8, where the thickness of the dried porous layer was 3 μm.

Embodiment 9 (Separator E9)

PE powder having a molecular weight of 2 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 7.7 times, and the stretching ratio in the transvers direction was 7 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E9, where the thickness of the dried porous layer was 3 μm.

Embodiment 10 (Separator E10)

PE powder having a molecular weight of 2.5 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 8.3 times, and the stretching ratio in the transvers direction was 7.3 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E10, where the thickness of the dried porous layer was 3 μm.

Embodiment 11 (Separator E11)

PE powder having a molecular weight of 2.5 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 9 times, and the stretching ratio in the transvers direction was 8.5 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E11, where the thickness of the dried porous layer was 3 μm.

Table 3 lists performance test results of E7-E11.

TABLE 3

| Material No. | Ratio of Puncture Elongation to Puncture Force (mm/N) | Puncture Force (N) | Absolute Value of MD-TD Tensile Strength Difference (N/cm²) | Thickness of Porous Substrate (um) | Porosity of Porous Substrate (%) | Air Permeability of Porous Substrate (s/100 cc) | Nail Penetration Test Pass Rate (%) |
|---|---|---|---|---|---|---|---|
| E7 | 3.1 | 1 | 10000 | 7 | 23 | 330 | 30 |
| E8 | 3.1 | 2.5 | 10000 | 7 | 25 | 240 | 30 |
| E9 | 3.1 | 5.3 | 10000 | 7 | 26 | 190 | 35 |
| E10 | 3.1 | 6.7 | 10000 | 7 | 23 | 280 | 35 |
| E11 | 3.1 | 8 | 10000 | 7 | 27 | 360 | 40 |

Based on the above test data, it can be known that in the case in which the ratio of the puncture elongation to the puncture force of the porous substrate is the same, the change in the puncture force has a slight influence on the nail penetration test pass rate.

4. Embodiments 12-19 (Changing the Absolute Value of the Difference Between the MD Tensile Strength and the TD Tensile Strength)

Embodiment 12 (separator E12)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 5.5 times, and the stretching ratio in the transvers direction was 5.6 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E12, where the thickness of the dried porous layer was 3 μm.

Embodiment 13 (Separator E13)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 5.4 times, and the stretching ratio in the transvers direction was 5.6 times. After that, the paraffin oil in the porous substrate was extracted with dichloromethane, followed by performing the drying and heat setting to the porous substrate. Furthermore, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E13, where the thickness of the dried porous layer was 3 μm.

Embodiment 14 (Separator E14)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 5.9 times, and the stretching ratio in the transvers direction was 5.5 times. After that, the paraffin oil in the porous substrate was extracted with dichloromethane, followed by performing the drying and heat setting to the porous substrate. In addition, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E14, where the thickness of the dried porous layer was 3 μm.

Embodiment 15 (Separator E15)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 6 times, and the stretching ratio in the transvers direction was 5.4 times. After that, the paraffin oil in the porous substrate was extracted with dichloromethane, followed by performing the drying and heat setting to the porous substrate. Additionally, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E15, where the thickness of the dried porous layer was 3 μm.

Embodiment 16 (Separator E16)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 6 times, and the stretching ratio in the transvers direction was 5.3 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E16, where the thickness of the dried porous layer was 3 μm.

Embodiment 17 (Separator E17)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 6 times, and the stretching ratio in the transvers direction was 5.1 times. After that, the paraffin oil in the porous substrate was extracted with dichloromethane, followed by performing the drying and heat setting to the porous substrate. Additionally, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E17, where the thickness of the dried porous layer was 3 μm.

Embodiment 18 (Separator E18)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 6.5 times, and the stretching ratio in the transvers direction was 4.2 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E18, where the thickness of the dried porous layer was 3 μm.

Embodiment 19 (Separator E19)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 6.7 times, and the stretching ratio in the transvers direction was 3.1 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E19, where the thickness of the dried porous layer was 3 μm.

Table 4 lists performance test results of E12-E19.

TABLE 4

| Material No. | Ratio of Puncture Elongation to Puncture Force (mm/N) | Puncture Force (N) | Absolute Value of MD-TD Tensile Strength Difference (N/cm$^2$) | Thickness of Porous Substrate (um) | Porosity of Porous Substrate (%) | Air Permeability of Porous Substrate (s/100 cc) | Nail Penetration Test Pass Rate (%) |
|---|---|---|---|---|---|---|---|
| E12 | 3.1 | 2.5 | 1220 | 7 | 32 | 188 | 80 |
| E13 | 3.1 | 2.5 | 2350 | 7 | 28 | 157 | 75 |
| E14 | 3.1 | 2.5 | 3880 | 7 | 28 | 257 | 70 |
| E15 | 3.1 | 2.5 | 5210 | 7 | 25 | 345 | 55 |
| E16 | 3.1 | 2.5 | 6750 | 7 | 26 | 278 | 50 |
| E17 | 3.1 | 2.5 | 8530 | 7 | 24 | 342 | 40 |
| E18 | 3.1 | 2.5 | 15000 | 7 | 30 | 286 | 30 |
| E19 | 3.1 | 2.5 | 20000 | 7 | 23 | 314 | 30 |

Based on the above test data, it can be known that in the case in which the ratio of the puncture elongation to the puncture force of the porous substrate is the same, the absolute value of the difference between the MD tensile strength and the TD tensile strength of the porous substrate has a certain influence on the nail penetration test pass rate. The larger the absolute value of the difference, the lower the nail penetration test pass rate. That is, compared with Comparative Embodiments 1-3, the smaller the absolute value of the difference between the MD tensile strength and the TD tensile strength of the porous substrate is set, the more favorably the nail penetration test pass rate is improved.

5. Embodiments 20-24 (Changing the Types of the Binder and Inorganic Particles in the Porous Layer)

Embodiment 20 (separator E20)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 5.6 times, and the stretching ratio in the transvers direction was 5.4 times. After that, the paraffin oil in the porous substrate was extracted with dichloromethane, followed by performing the drying and heat setting to the porous substrate. Further, inorganic particles aluminum oxide and a binder PVDF in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E20, where the thickness of the dried porous layer was 3 μm.

Embodiment 21 (Separator E21)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 5.8 times, and the stretching ratio in the transvers direction was 5.5 times. After that, the paraffin oil in the porous substrate was extracted with dichloromethane, followed by performing the drying and heat setting to the porous substrate. Further, inorganic particles aluminum oxide and a binder polyacrylate ester in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E21, where the thickness of the dried porous layer was 3 μm.

Embodiment 22 (Separator E22)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 5.9 times, and the stretching ratio in the transvers direction was 5.5 times. After that, the paraffin oil in the porous substrate was extracted with dichloromethane, followed by performing the drying and heat setting to the porous substrate. Further, inorganic particles boehmite and a binder PVDF in a mass ratio of 85:15 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E22, where the thickness of the dried porous layer was 3 μm.

Embodiment 23 (Separator E23)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 5.5 times, and the stretching ratio in the transvers direction was 5.7 times. After that, the paraffin oil in the porous substrate was extracted with dichloromethane, followed by performing the drying and heat setting to the porous substrate. Further, inorganic particles magnesium hydroxide and a binder PVDF in a mass ratio of 91:9 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E23, where the thickness of the dried porous layer was 3 μm.

Embodiment 24 (Separator E24)

PE powder having a molecular weight of 1.1 million and paraffin oil were mixed in a ratio of the PE powder to the paraffin oil being 1:4, extruded at high temperature and cast into a film. The film was stretched in the machine direction and the transverse direction, wherein the stretching ratio in the machine direction was 5.5 times, and the stretching ratio in the transvers direction was 5.6 times. After that, the paraffin oil in the porous substrate was extracted with dichloromethane, followed by performing the drying and heat setting to the porous substrate. Further, inorganic particles aluminum oxide and a binder PVDF in a mass ratio of 70:30 were added into a solvent deionized water and uniformly mixed to form a slurry having a solid content of 45%. The slurry was uniformly coated on one surface of the 7 μm-thick porous substrate (PE) by a microgravure method, and oven drying was performed to obtain a composite porous separator E24, where the thickness of the dried porous layer was 3 μm.

Table 5 lists performance test results of E20-E24.

TABLE 5

| Material No. | Binder in Porous Layer | Inorganic Particles in Porous Layer | Ratio of Puncture Elongation to Puncture Force (mm/N) | Puncture Force (N) | Absolute Value of MD-TD Tensile Strength Difference (N/cm2) | Thickness of Porous Substrate (um) | Porosity of Porous Substrate (%) | Air Permeability of Porous Substrate (s/100 cc) | Nail Penetration Test Pass Rate (%) |
|---|---|---|---|---|---|---|---|---|---|
| E20 | PVDF (9 wt %) | Al$_2$O$_3$ (91 wt %) | 3.1 | 2.5 | 2660 | 7 | 29 | 155 | 75 |
| E21 | Polyacrylate (9 wt %) | Al$_2$O$_3$ (91 wt %) | 3.1 | 2.5 | 3290 | 7 | 31 | 235 | 70 |
| E22 | PVDF (15 wt %) | Boehmite (85 wt %) | 3.1 | 2.5 | 3870 | 7 | 29 | 420 | 70 |
| E23 | PVDF (9 wt %) | Magnesium Hydroxide (91 wt %) | 3.1 | 2.5 | 1760 | 7 | 28 | 337 | 80 |
| E24 | PVDF (30 wt %) | Al$_2$O$_3$ (70 wt %) | 3.1 | 2.5 | 870 | 7 | 25 | 280 | 75 |

Based on the above test data, it can be known that when the ratio of the puncture elongation to the puncture force of the porous substrate is the same and the difference between the MD tensile strength and the TD tensile strength is small, the use of different types of binders and inorganic particles has little influence on the nail penetration test pass rate and processability.

The above description summarizes the features of several embodiments, which enables those of ordinary skill in the art to understand the various aspects of the present application. Those of ordinary skill in the art can readily use the present application as a basis for designing or modifying other compositions to achieve the same objectives and/or the same advantages as the embodiments herein. It is also to be understood by those of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are performed in a specific order, it should be understood that these operations can be combined, subdivided, or reordered to form an equivalent method without departing from the teachings of the present application. Therefore, the order and grouping of operations are not a limitation to the present application unless specifically indicated herein.

What is claimed is:

1. An electrochemical device, comprising:
a cathode;
an anode; and
a separator comprising a porous substrate formed by a polyethylene having a molecular weight of about 0.2 million to about 2.5 million and having a thickness of about 1 μm to about 40 μm and a porosity of about 15% to 29%; and
a porous layer, the porous layer being disposed on a surface of the porous substrate and comprising inorganic particles and a binder,
wherein the binder is at least one polymer selected from the group consisting of polyacrylate ester, polyacrylic acid, polyacrylate salt, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, acrylonitrile-styrene-butadiene copolymer, polyvinyl alcohol, polyvinyl ether, and styrene-butadiene copolymer,
wherein the porous substrate is a polymer film, a multilayer polymer film or a nonwoven fabric, and a ratio of a puncture elongation to a puncture force of the porous substrate is about 1.5 to about 25 mm/N, wherein the puncture force is perpendicular to a surface of the porous substrate, the puncture force of the porous substrate is about 0.1 to about 10 N, and the puncture elongation is an extension length of the porous substrate in the direction perpendicular to the surface of the porous substrate when the porous substrate is punctured; and wherein the puncture elongation and the puncture force are determined by using a high-iron tensile machine, the porous substrate is fixed in a fixture having a circular hole in the middle, the fixed porous substrate is punctured by a circular puncture needle, the puncture elongation and the puncture force generated at the time when the porous substrate is punctured are recorded, and the ratio of the puncture elongation to the puncture force is calculated.

2. The electrochemical device according to claim 1, wherein an absolute value of a difference between a machine direction tensile strength of the porous substrate and a transverse direction tensile strength of the porous substrate is about 20000 N/cm$^2$ or below.

3. The electrochemical device according to claim 1, wherein the inorganic particles comprise at least one selected from the group consisting of the following inorganic particles: aluminum oxide, silicon dioxide, magnesium oxide, titanium oxide, hafnium dioxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide and barium sulfate.

4. The electrochemical device according to claim 1, wherein the porous substrate has a porosity of 23% to 29%.

5. The electrochemical device according to claim 1, wherein the inorganic particles are selected from the group consisting of aluminum oxide, magnesium hydroxide, and boehmite.

6. The electrochemical device according to claim 1, wherein the binder is polyacrylate ester.

7. The electrochemical device according to claim 1, wherein the electrochemical device is a lithium-ion battery.

8. The electrochemical device according to claim 1, wherein the separator is inserted between the cathode and the anode to form an electrode assembly.

9. The electrochemical device according to claim 8, wherein the electrode assembly is winding type.

10. The electrochemical device according to claim 1, wherein the ratio of the puncture elongation of the porous substrate to the puncture force of the porous substrate is about 1.5 mm/N to about 20 mm/N.

11. The electrochemical device according to claim 1, wherein the ratio of the puncture elongation of the porous substrate to the puncture force of the porous substrate is about 1.5 mm/N to about 12 mm/N.

\* \* \* \* \*